(12) United States Patent
Grattan

(10) Patent No.: US 11,186,317 B2
(45) Date of Patent: Nov. 30, 2021

(54) VEHICLE BODY STRUCTURE

(71) Applicant: Nissan North America, Inc., Franklin, TN (US)

(72) Inventor: Patrick Grattan, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 80 days.

(21) Appl. No.: 16/450,272

(22) Filed: Jun. 24, 2019

(65) Prior Publication Data

US 2020/0398896 A1    Dec. 24, 2020

(51) Int. Cl.
*B62D 21/15* (2006.01)
*B62D 25/02* (2006.01)
*B62D 25/20* (2006.01)

(52) U.S. Cl.
CPC ......... *B62D 21/157* (2013.01); *B62D 25/025* (2013.01); *B62D 25/2036* (2013.01)

(58) Field of Classification Search
CPC . B62D 21/157; B62D 25/025; B62D 25/2036
USPC ......... 296/204, 187.04, 209, 187.12, 187.08, 296/203.03
See application file for complete search history.

(56) References Cited

U.S. PATENT DOCUMENTS

| 5,352,011 | A  | * | 10/1994 | Kihara  | B62D 23/00 296/203.03 |
|---|---|---|---|---|---|
| 6,145,923 | A  | * | 11/2000 | Masuda  | B62D 25/082 296/1.03 |
| 6,951,366 | B2 | * | 10/2005 | Tomita  | B62D 21/09 296/187.08 |
| 9,884,648 | B1 |   | 2/2018  | Grattan et al. | |
| 9,956,991 | B1 |   | 5/2018  | Nishikawa et al. | |
| 10,029,733 | B1 |   | 7/2018  | Grattan | |
| 2006/0214473 | A1 | * | 9/2006 | Ito | B62D 25/20 296/193.07 |

OTHER PUBLICATIONS

U.S. Appl. No. 16/023,954; Vehicle Body Structure; M Mcgory et al.; filed Jun. 29, 2018.

* cited by examiner

*Primary Examiner* — Joseph D. Pape
*Assistant Examiner* — Dana D Ivey
(74) *Attorney, Agent, or Firm* — Global IP Counselors, LLP

(57) ABSTRACT

A vehicle body structure includes a sill structure, a floor panel and a reinforcing bracket. The sill structure extends along a lower end of a door opening in a vehicle longitudinal direction. The floor panel is fixed to the sill structure. The reinforcing bracket has a first flange fixed to the sill structure, a second flange fixed to the floor panel and a mid-section that extends from the first flange to the second flange. The mid-section has a contoured surface with an overall surface length as measured along the contoured surface from the first flange to the second flange that is greater than a distance measured between the first flange and the second flange.

19 Claims, 5 Drawing Sheets

VEHICLE BODY STRUCTURE

BACKGROUND

Field of the Invention

The present invention generally relates to a vehicle body structure. More specifically, the present invention relates to a vehicle body structure that includes reinforcing brackets fixed to a floor panel and to a sill structure of a vehicle, the reinforcing brackets being configured to elongate in response to shearing forces acting on the floor panel and/or the sill structure.

Background Information

During an off-center impact event where impacting forces act on, for example, the sill structure of a vehicle body structure that is welded to a floor panel of the vehicle body structure, impacting forces might be sufficient to cause relative movement in a vehicle longitudinal direction between the sill structure and the floor panel causing deformation of at least the floor panel.

SUMMARY

One object of the present disclosure is to provide a vehicle body structure with at least one reinforcing bracket that is fixed to a floor panel and to a sill structure of a vehicle, the reinforcing bracket being configured to elongate in response to shearing forces acting on the floor panel and/or the sill structure restricting relative between the floor panel and the sill structure in a vehicle longitudinal direction.

In view of the state of the known technology, one aspect of the present disclosure is to provide a vehicle body structure with a sill structure, a floor panel and a reinforcing bracket. The sill structure extends along a lower end of a door opening in a vehicle longitudinal direction. The floor panel is fixed to the sill structure. The reinforcing bracket has a first flange fixed to the sill structure, a second flange fixed to the floor panel and a mid-section that extends from the first flange to the second flange. The mid-section has a contoured surface with an overall surface length as measured along the contoured surface from the first flange to the second flange that is greater than a distance measured between the first flange and the second flange.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
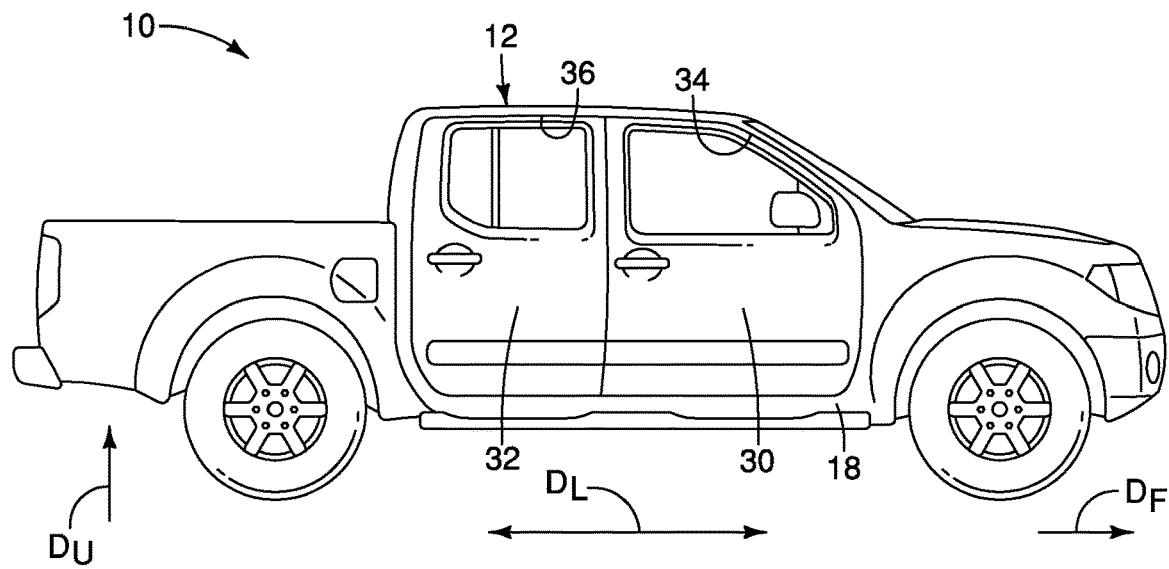
FIG. 1 is a side view of a vehicle that includes a sill structure, a front door and a rear door in accordance with a first embodiment.
Figure 2:
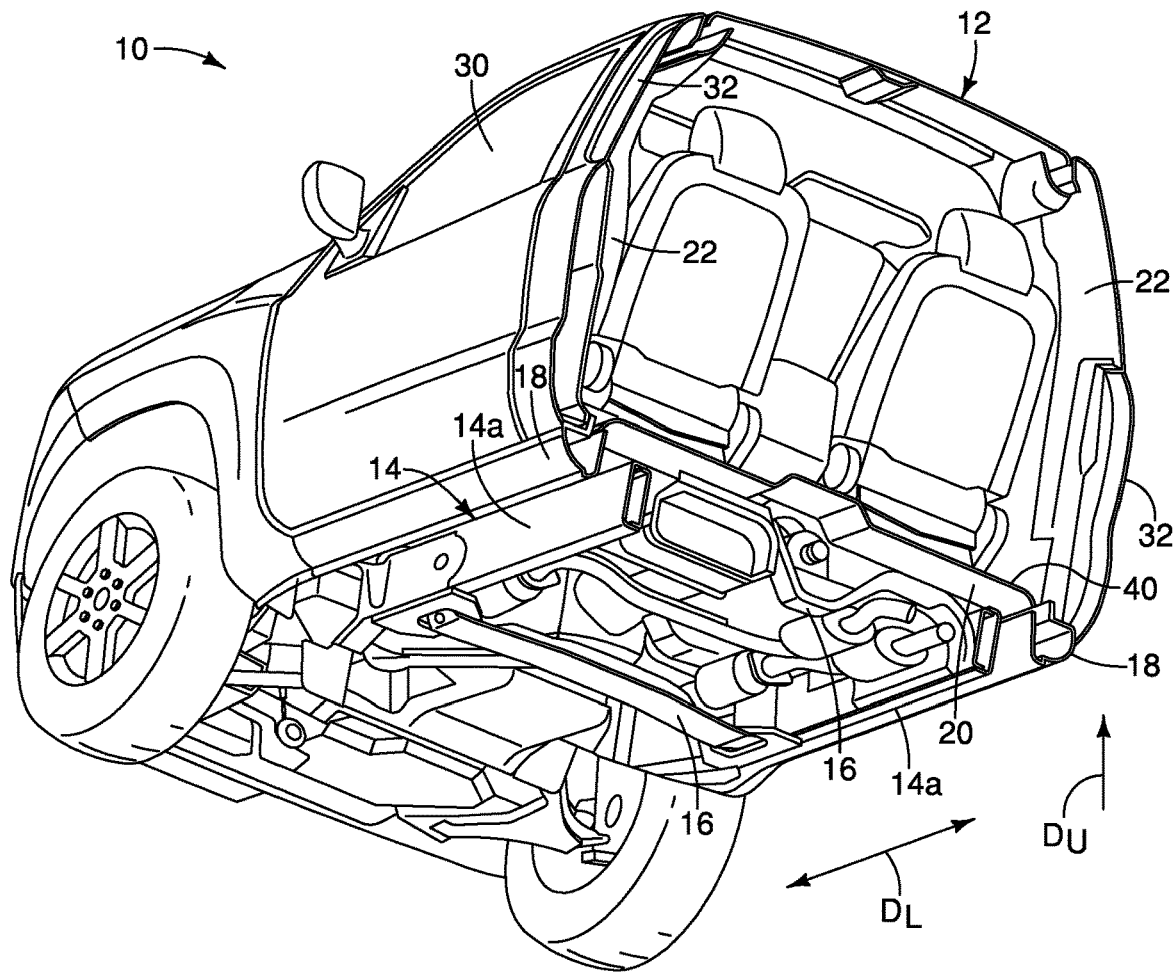
FIG. 2 is a perspective cross-section of the vehicle depicted in FIG. 1, showing a floor structure attached to the sill structure in accordance with the first embodiment.

Referring initially to FIGS. 1 and 2, a vehicle 10 having a vehicle body structure 12 is illustrated in accordance with a first embodiment. The vehicle 10 and vehicle body structure 12 define a vehicle longitudinal direction $D_L$, an upward direction $D_U$ and a forward direction $D_F$.

Figure 3:
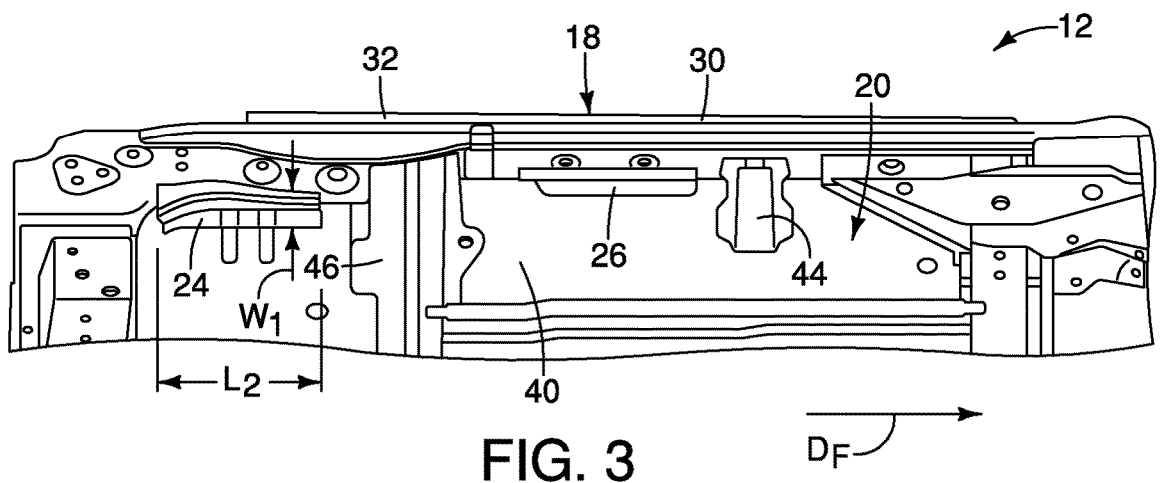
FIG. 3 is a perspective view of an underside of the vehicle showing the floor structure, the sill structure and first and second reinforcing brackets attached to the floor structure and the sill structure in accordance with the first embodiment.
Figure 4:
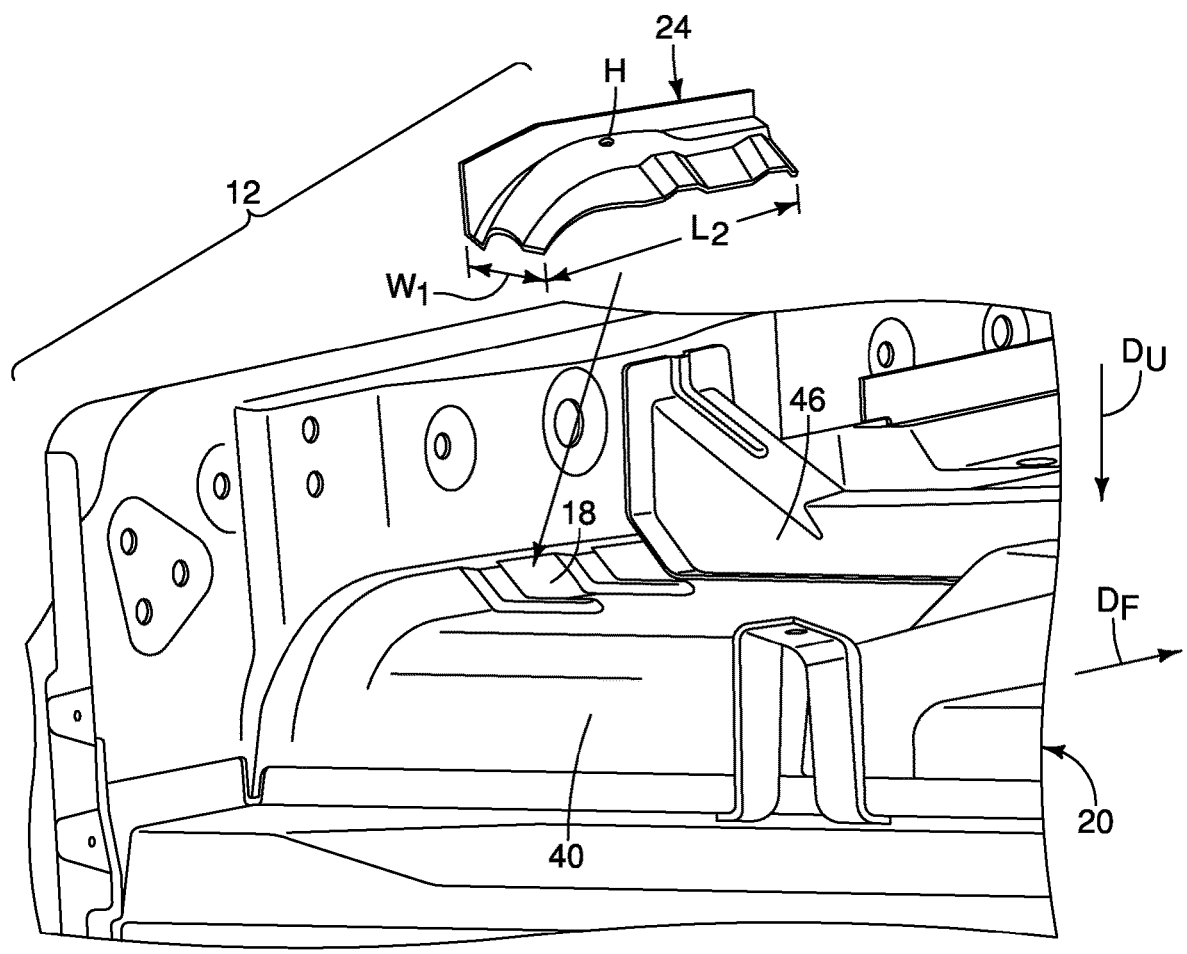
FIG. 4 is an exploded perspective view of the underside of the vehicle (the vehicle being depicted upside down) showing the floor structure, the sill structure and the first reinforcing bracket in accordance with the first embodiment.
Figure 5:
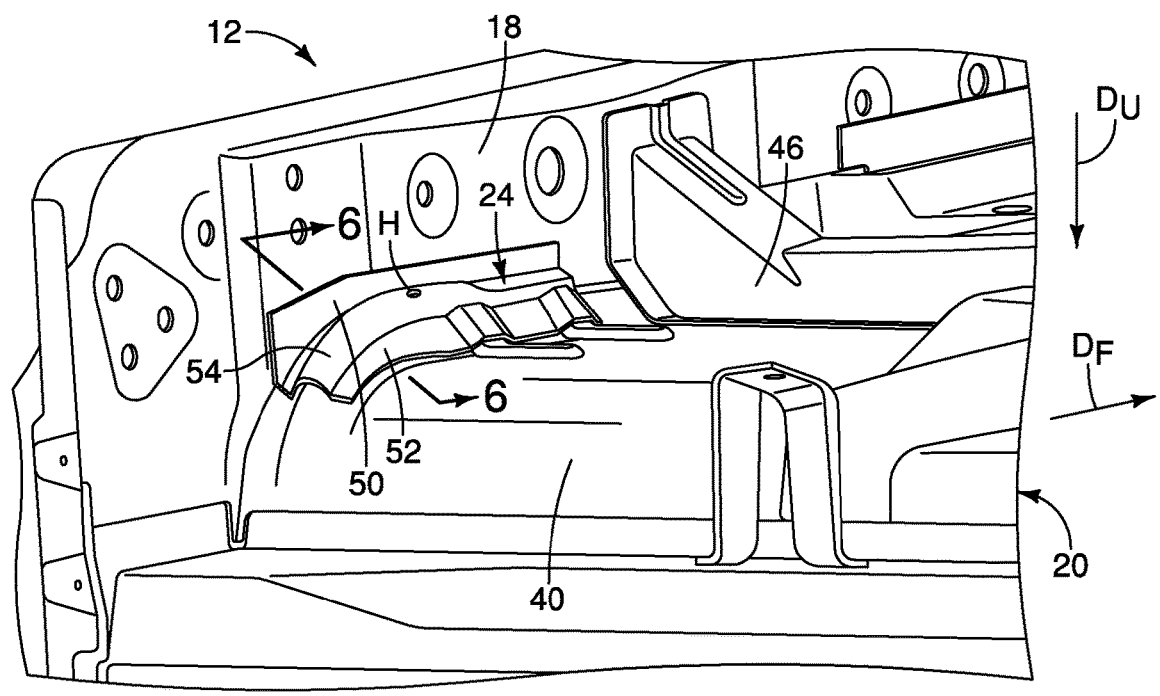
FIG. 5 is another perspective view of the underside of the vehicle (the vehicle being depicted upside down) showing the reinforcing bracket welded to the floor structure and the sill structure in accordance with the first embodiment.

As shown in FIGS. 2-5, the vehicle body structure 12 of the vehicle 10 includes, among other components and structures, a frame structure 14, a cross-member 16, a sill structure 18, a floor structure 20, pillar structures such as B-pillars 22, a first reinforcing bracket 24 (FIGS. 3-5) and a second reinforcing bracket 26 (FIGS. 3-5).

The frame structure 14 is basically a combination of steel or metallic beams welded together. The frame structure 14 defines a foundation with suspension and steering assemblies being attached to the frame structure 14. Further, the vehicle body structure 12 is attached to and supported by the frame structure 14. Longitudinal beams 14a of the frame structure 14 are shown in FIG. 2 at opposite sides of the underside of the vehicle 10, along with a cross-members 16 that extend between the longitudinal beams 14a and are fixedly attached to each of the longitudinal beams 14a.

In the depicted embodiment, the frame structure 14 is a conventional truck frame, with the vehicle body structure 12 resting on and fixed thereto. Although only two cross-members 16 are shown in FIG. 2, it should be understood from the drawings and the description herein that the frame structure 14 can include additional cross-members (not shown). It should also be understood from the drawings and the description hereinbelow, that the vehicle body structure 12 can alternatively be a unibody construct with the vehicle body structure 12 itself defining elements or portions thereof that serve as frame structures. Since frame structures and unibody structures are conventional vehicle components well known in the art, further description is omitted for the sake of brevity.

In the depicted embodiment, the vehicle body structure 12 is attached to the frame structure 14 by, for example, mechanical fasteners (not shown). Each of the sill structures 18 is a beam of the vehicle body structure 12 that can be formed as a single element or can be constructed from a plurality of panels that have been appropriately shaped and welded together to form the beam. There are two sill structures 18 one located on each lateral outboard sides of the vehicle below front and rear doors 30 and 32. Since the sill structures 18 are identical (except that they are symmetrical opposites of one another), only one of the sill structures 18 is described below for the sake of brevity.

As shown in FIGS. 2-5, the sill structure 18 extends under the front door 30 and the rear door 32 of the vehicle 10. More specifically, the sill structure 18 defines a lower portion of each of a front door opening 34 and a rear door opening 36. The sill structure 18 extends the vehicle longitudinal direction $D_L$ along the bottom of each of the front and rear door openings 34 and 36.

The B-pillars 22 are conventional structures that are fixedly attached to the sill structure 18, as shown in FIG. 2, by, for example welding techniques. Each of the B-pillars 22 can be constructed of several panels welded together. The B-pillars 22 extend upward from respective ones of the sill structures 18 to a roof structure of the vehicle body structure 12. Since B-pillar structures are conventional vehicle structures, further description is omitted for the sake of brevity.

Figure 6:
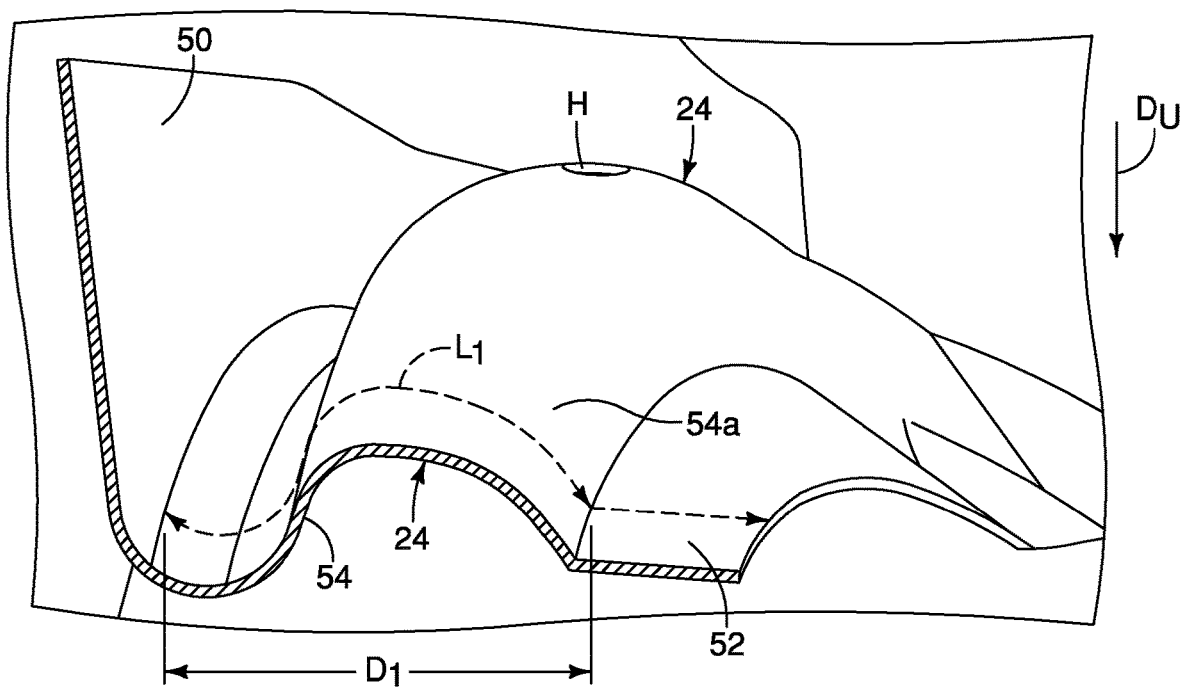
FIG. 6 is a cross-sectional view of the reinforcing bracket taken along the line 6-6 in FIG. 5, showing a first flange, a second flange and a mid-section in accordance with the first embodiment.
Figure 7:
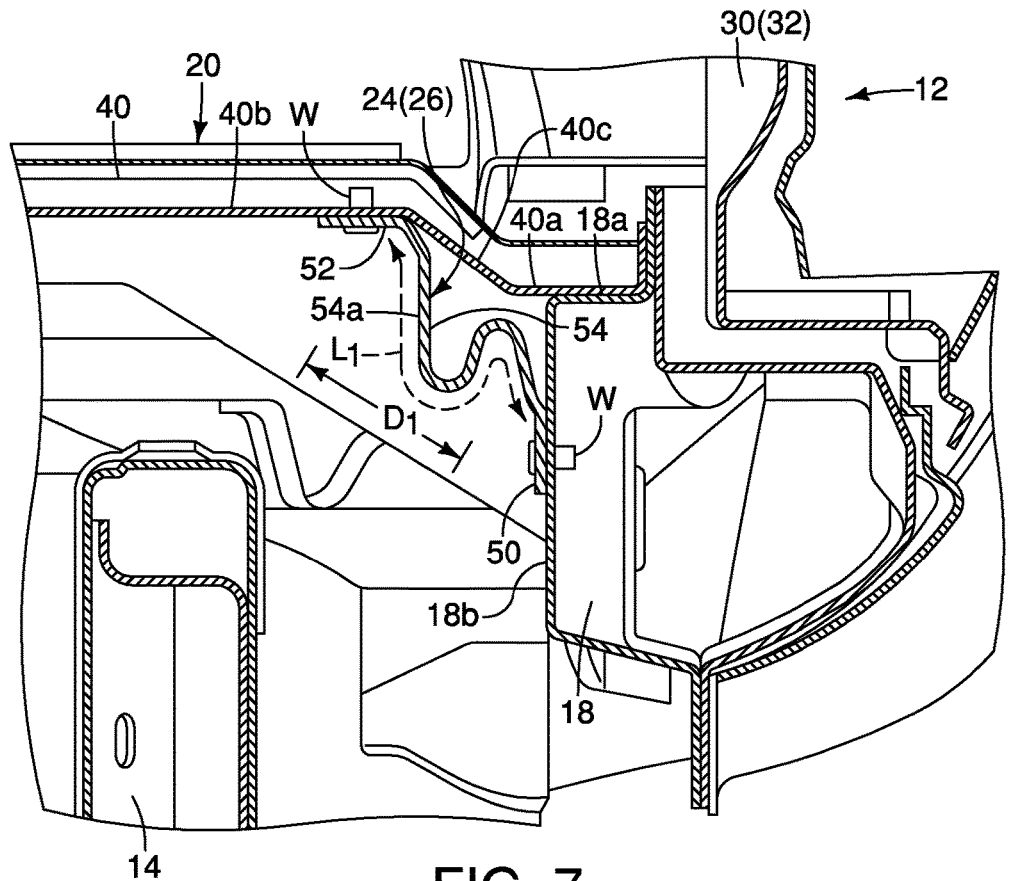
FIG. 7 is a cross-sectional view of a portion of the vehicle showing the floor structure, the sill structure and the reinforcing bracket in accordance with the first embodiment.

As shown in FIGS. 2-5 and 7, the floor structure 20 includes a main floor panel 40, As shown in FIG. 7, the main floor panel 40 includes an outer flange portion 40a, a first portion 40b and a second portion 40c. The second portion 40c extends from the first portion 40b to the outer flange portion 40a. The outer flange portion 40a is fixed to the sill structure 18. The floor structure 20, as shown in FIGS. 2-5 and 6, also includes a first support member 44 and a second support member 46. As shown in FIG. 3, the first support member 44 is welded to the main floor panel 40 of the floor structure 20 and the sill structure 18. There are two first support members 44, one on each lateral side of the vehicle 10. However, only one of the first support members 44 is shown in the drawings. The second support member 46 extends between the two sill structures 18 and is fixed to each of the sill structures 18. However, only one end of the second support member 46 is shown in FIGS. 3 and 4. It should be understood from the drawings and the description herein that there is symmetry between the depicted side of the underside of the vehicle 10 and the side not depicted. Preferably the first support member 44 and the second support member 46 are welded to the sill structures 18.

FIGS. 3-6 show the underside of the vehicle 10. However, it should be understood from FIGS. 3-6 that the main floor panel 40 of the floor structure 20 overlays an upper surface (not shown) of the first support member 44 and an upper surface (not shown) of the second support member 46. Preferably, the main floor panel 40 is welded to each of the first support member 44 and the second support member 46.

Further, the outer flange portion 40a of the main floor panel 40 is fixedly attached to the sill structures 18, as shown in FIGS. 2 and 7. Preferably, the outer flange portion 40a the main floor 40 is welded to an upper surface portion 18a of the sill structure 18.

As shown in FIG. 3, the first reinforcing bracket 24 and the second reinforcing bracket 26 are fixed to a lower surface of the main floor panel 40 and an upright surface of the sill structure 18 at a location lower than the main floor panel 40. As shown in FIGS. 4, 5 and 6 (FIGS. 4, 5 and 6 show the vehicle upside down for clarity) the first reinforcing bracket 24 curves upward following the contours of a rearward area of the main floor panel 40. As shown in FIG. 3, the second reinforcing bracket 26 has no such curvature because it attaches to a flat portion of the lower surface of the main floor panel 40. However, the first and second reinforcing brackets 24 and 26 basically include the same three sections, as described below. Consequently, description of the first reinforcing bracket 24 applies equally to both of the first and second reinforcing brackets 24 and 26.

The first reinforcing bracket 24 (and also the second reinforcing bracket 26) includes a first flange 50 fixed to a vertically extending surface 18b of the sill structure 18, a second flange 52 fixed to the first portion 40b of the floor panel 40 and a mid-section 54 that extends from the first flange 50 to the second flange 52. The first flange 50 is generally planar or flat and is welded to the vertically extending surface 18a of the sill structure 18. The second flange 52 has various contours to conform to the overall shape of the floor panel 40 and is welded to the first portion 40b of the floor panel 40. However, it should be understood from the drawings and the description herein that the second flange 52 can also be flat or planar. The mid-section 54 has a contoured lower surface 54a with an overall surface length L1 as measured along the contoured surface 54a from the first flange 50 to the second flange 52. As shown in FIGS. 6 and 7, the overall surface length L1 is greater than a distance Di measured between the areas of the first flange 50 and the second flange 52 that are closest to one another. Further, the mid-section 54 extends adjacent to and spaced apart from the second portion 40c of the floor panel 40. Also, the first flange 50 and the second flange 52 are perpendicular to one another, or approximately perpendicular to one another.

The mid-section 54 is shaped and contoured with a sinusoidal or serpentine shape (as viewed in cross-section in FIGS. 6 and 7). As shown in FIGS. 4, 5 and 7, the mid-section 54 has a drain hole H that extends therethrough. In the event that moisture or water is captured by the mid-section 54, the moisture and water can drain through the drain hole H.

The overall design of the mid-section 54 is such that in response to an off-center impact force to the front of the vehicle 10, the sill structure 18 moves relative to the floor panel 40. Since the first flange 50 is fixed (welded) to the sill structure, the first flange 50 moves with the sill structure 18. Since the second flange 52 is fixed to the floor panel 40, the second flange 52 moves with the floor panel 40. Consequently, such relative movement causes the mid-portion 54 of the reinforcing bracket 24 to deform and elongate.

Figure 8:
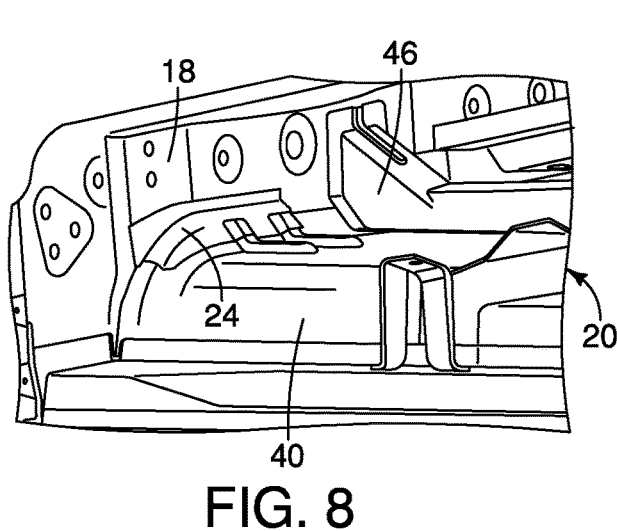
FIG. 8 is a perspective view of the underside of the vehicle (the vehicle being depicted upside down) showing the reinforcing bracket welded to the floor structure and the sill structure prior to an impact event in accordance with the first embodiment.
Figure 9:
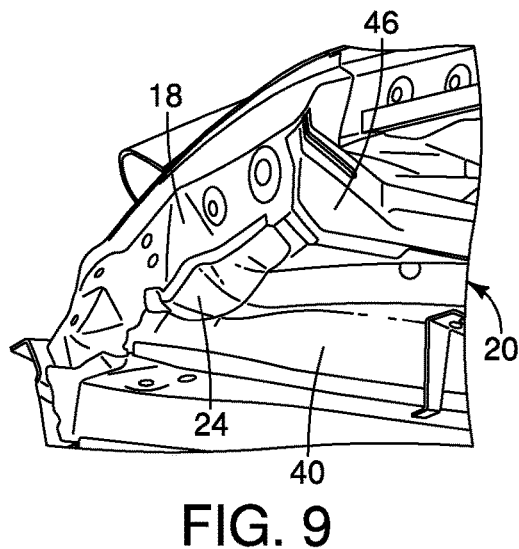
FIG. 9 is another perspective view of the underside of the vehicle (the vehicle being depicted upside down) showing the reinforcing bracket welded to the floor structure and the sill structure after an impact event in accordance with the first embodiment.

FIG. 8 shows the vehicle 10 in a non-impacted state. FIG. 9 shows the vehicle 10 after an off-center impact event. A comparison of FIGS. 8 and 9 shows that after an impacting force has been applied to the front of the vehicle 10 along a trajectory approximately aligned with the sill structure 18, the impacting forces cause movement of the sill structure 18 rearward relative to the floor panel 40. The addition of the reinforcing brackets 24 and 26 limits or restricts the relative movement between the sill structure 18 and the floor panel 40 due to shape and contours of the mid-section 54. Specifically, as the sill structure 18 moves relative to the floor panel 40, a portion of the impacting forces (shear forces) are absorbed by the reinforcing brackets 24 and 26. Initially, the reinforcing brackets 24 and 26 resist deformation. Subsequently, the mid-sections 54 of the reinforcing brackets 24 and 26 begin to elongate and deform until the mid-sections 54 achieve their true overall length absorbing a portion of the shear forces of the impacting energy. At this point, the reinforcing brackets 24 and 26 limit or at least partially restrict further movement of the sill structure 18 relative to the floor panel 40.

As shown in FIGS. 3 and 4, the first reinforcing bracket 24 has an overall length $L_2$ measured in the vehicle longitudinal direction $D_L$ and an overall width $W_1$ measured in a vehicle lateral direction perpendicular to the vehicle longitudinal direction $D_L$. The overall length $L_2$ is at least twice the size of the overall width $W_1$.

Rigidly fixed to one another by welds W as shown in FIG. 7, the reinforcing bracket 24 (and 26), the sill structure 18 and the floor panel 40 are further configured such that in response to the impact force, separation of the floor panel 40 from the sill structure 18 is reduced or prevented.

In the absence of the first and second reinforcing brackets 24 and 26, under extreme off-center impact event circumstances, the floor panel 40 can separate from the sill structure 18.

The inclusion of the first and second reinforcing brackets 24 and 26 is advantageous in that the inclusion of one or both of the first and second reinforcing brackets 24 and 26 reduces or prevents the separation of the floor panel 40 from the sill structure 18. Further, in the event that separation of the floor panel 40 from the sill structure 18 does occurs as a result of the impact event, one or both of the first and second reinforcing brackets 24 and 26 provides a continuous connection between the floor panel 40 and the sill structure 18. More specifically, the elongation and/or deformation of the mid-sections 54 of the first and second reinforcing brackets 24 and 26 during the impact event eventually results in the mid-sections 54 becoming taut much like a strap, thereby preventing or at the very least, limiting or restricting any further separation of the floor panel 40 from the sill structure 18.

Second Embodiment

Figure 10:
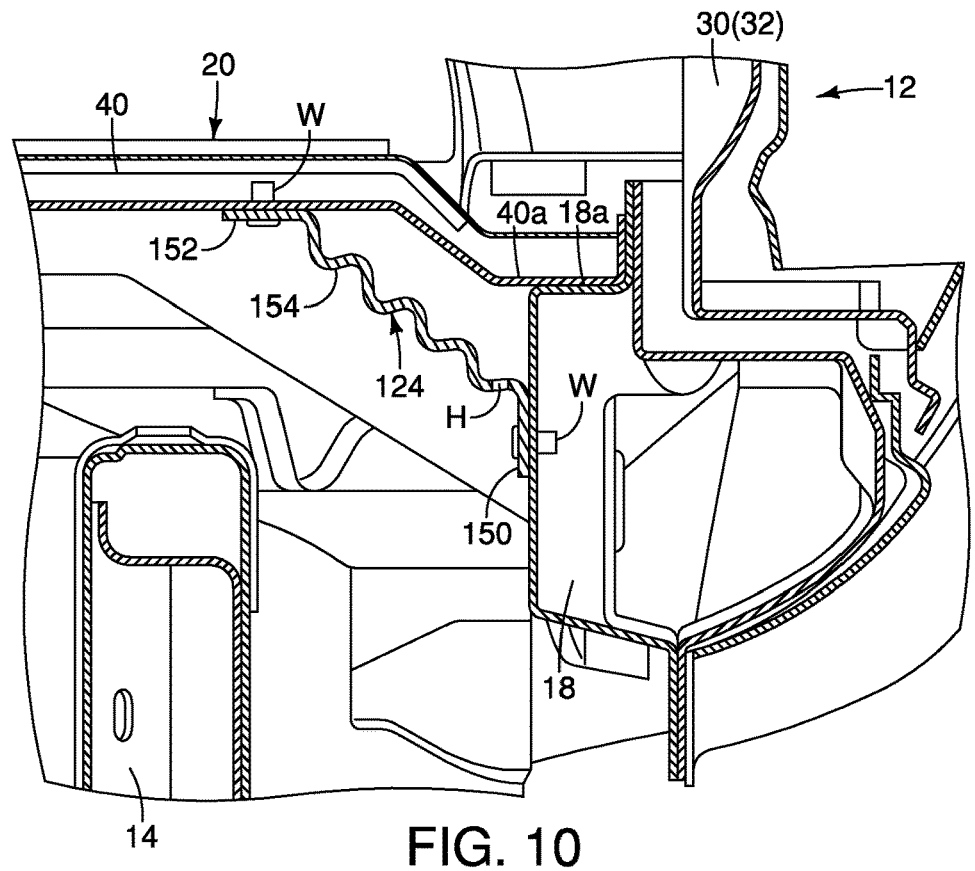
FIG. 10 is a cross-sectional view of a portion of the vehicle showing the floor structure, the sill structure and a reinforcing bracket in accordance with a second embodiment.

Referring now to FIG. 10, a reinforcing bracket 124 installed to the vehicle body structure 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle body structure 12 is as described above in the first embodiment, except that the reinforcing bracket 24 has been replaced with the reinforcing bracket 124. Specifically, the vehicle body structure 12 includes all other elements described in the first embodiment, including the floor structure 20, the floor panel 40 and the sill structure 18.

The reinforcing bracket 124 includes a first flange 150 that is welded via welds W to the sill structure 18, a second flange 152 that is welded via welds W to the floor panel 40 and a mid-section 154 that extends from the second flange 152 to the first flange 150. The reinforcing bracket 124 serves all the functional and structural purposes of the reinforcing bracket 24 of the first embodiment. Further, the reinforcing bracket 124 is formed with the same relative dimensions of the reinforcing bracket 24 of the first embodiment.

In the second embodiment, the mid-section 154 has an undulating cross-sectional appearance, as shown in FIG. 10. More specifically, the mid-section 154 has a sinusoidal shape or wavy shape, as viewed in the vehicle longitudinal direction. Alternatively, the mid-section 154 can have a sawtooth or zig-zag shape that also defines and undulating shape.

Third Embodiment

Figure 11:
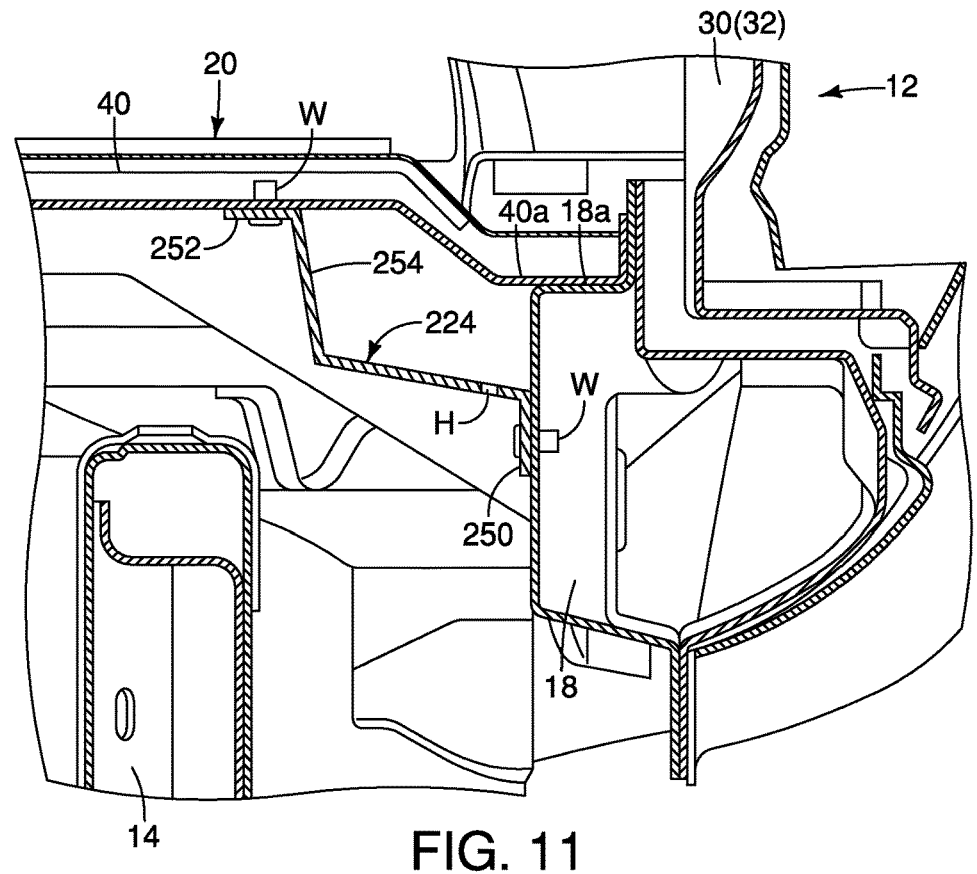
FIG. 11 is a cross-sectional view of a portion of the vehicle showing the floor structure, the sill structure and a reinforcing bracket in accordance with a third embodiment.

Referring now to FIG. 11, a reinforcing bracket 224 installed to the vehicle body structure 12 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vehicle body structure 12 is as described above in the first embodiment, except that the reinforcing bracket 24 has been replaced with the reinforcing bracket 224. Specifically, the vehicle body structure 12 includes all other elements described in the first embodiment, including the floor structure 20, the floor panel 40 and the sill structure 18.

The reinforcing bracket 224 includes a first flange 250 that is welded via welds W to the sill structure 18, a second flange 252 that is welded via welds W to the floor panel 40 and a mid-section 254 that extends from the second flange 252 to the first flange 250. The reinforcing bracket 224 serves all the functional and structural purposes of the reinforcing bracket 24 of the first embodiment. Further, the reinforcing bracket 224 is formed with the same relative dimensions of the reinforcing bracket 24 of the first embodiment.

In the third embodiment, the mid-section 254 has a step shape as viewed in the vehicle longitudinal direction. More specifically, the mid-section 254 includes two non-parallel and not perpendicular sections.

In each of the embodiments described above, the reinforcing brackets 24 (and 26), 124 and 126 are each unitarily formed from a single material, such as medium strength, or high strength sheet metal.

The various vehicle elements and components, other than the reinforcing brackets 24 (and 26), 124 and 224, are conventional components that are well known in the art. Since such vehicle elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a sill structure that extends along a lower end of a door opening in a vehicle longitudinal direction;
   a floor panel having a first portion, a second portion and an outer flange portion, the second portion extending from the first portion to the outer flange portion, the outer flange portion being fixed to the sill structure; and
   a reinforcing bracket having a first flange fixed to the sill structure, a second flange fixed to the first portion of the floor panel and a mid-section that extends from the first flange to the second flange, the mid-section extending adjacent to and spaced apart from the second portion of the floor panel, the mid-section having a contoured surface with an overall surface length as measured along the contoured surface from the first flange to the second flange that is greater than a distance measured between the first flange and the second flange, the first flange and the second flange being perpendicular to one another.

2. The vehicle body structure according to claim 1, wherein
   the mid-section has a serpentine shape as viewed in the vehicle longitudinal direction.

3. The vehicle body structure according to claim 1, wherein
   the mid-section has a step shape as viewed in the vehicle longitudinal direction.

4. The vehicle body structure according to claim 1, wherein
   the mid-section has an undulating shape as viewed in the vehicle longitudinal direction.

5. The vehicle body structure according to claim 1, wherein
   the reinforcing bracket has an overall length measured in the vehicle longitudinal direction and an overall width measured in a vehicle lateral direction perpendicular to the vehicle longitudinal direction, the overall length being at least twice the size of the overall width.

6. The vehicle body structure according to claim 1, wherein
   the reinforcing bracket, the sill structure and the floor panel are configured such that in response to an impact force acting on the vehicle body structure, movement of the sill structure relative to the floor panel causes the reinforcing bracket to deform such that the first flange moves with the sill structure, the second flange moves with the floor panel and the mid-section deforms and elongates.

7. The vehicle body structure according to claim 6, wherein
   the reinforcing bracket, the sill structure and the floor panel are further configured such that in response to the impact force, separation of the floor panel from the sill structure is reduced or prevented.

8. A vehicle body structure, comprising:
   a sill structure that extends along a lower end of a door opening in a vehicle longitudinal direction;
   a floor panel having a first portion, a second portion and an outer flange portion, the second portion extending from the first portion to the outer flange portion, the outer flange portion being fixed to the sill structure; and
   a reinforcing bracket having a first flange fixed to the sill structure, a second flange fixed to the first portion of the floor panel and a mid-section that extends from the first flange to the second flange, the mid-section extending adjacent to and spaced apart from the second portion of the floor panel, the mid-section having a contoured surface with an overall surface length as measured along the contoured surface from the first flange to the second flange that is greater than a distance measured between the first flange and the second flange, the mid-section having a drain hole that extends therethrough.

9. A vehicle body structure, comprising:
   a sill structure having a sill structure that extends along a lower end of a door opening in a vehicle longitudinal direction;
   a floor panel fixed to the sill structure; and
   a reinforcing bracket having a first flange fixed to the sill structure, a second flange fixed to the floor panel and a mid-section that extends from the first flange to the second flange, the mid-section being spaced apart from the floor panel and the sill structure in a non-deformed state, the mid-section being shaped and contoured such that in response to an impact force, movement of the sill structure relative to the floor panel causes mid-section of the reinforcing bracket to deform such that the first flange moves with the sill structure while the second flange moves with the floor panel, while the mid-section deforms and elongates.

10. The vehicle body structure according to claim 9, wherein
    the reinforcing bracket, the sill structure and the floor panel are further configured such that in response to the impact force, separation of the floor panel from the sill structure is reduced or prevented.

11. The vehicle body structure according to claim 9, wherein
the reinforcing bracket, the sill structure and the floor panel are further configured such that in response to the impact force and an occurrence of separation of the floor panel from the sill structure, the reinforcing bracket provides a connection between the floor panel and the sill structure.

12. The vehicle body structure according to claim 9, wherein
the mid-section has a contoured surface with an overall surface length as measured along the contoured surface from the first flange to the second flange that is greater than a distance measured between the first flange and the second flange.

13. The vehicle body structure according to claim 9, wherein
the mid-section has a serpentine shape as viewed in the vehicle longitudinal direction.

14. The vehicle body structure according to claim 9, wherein
the mid-section has a step shape as viewed in the vehicle longitudinal direction.

15. The vehicle body structure according to claim 9, wherein
the mid-section has an undulating shape as viewed in the vehicle longitudinal direction.

16. The vehicle body structure according to claim 9, wherein
the reinforcing bracket has an overall length measured in the vehicle longitudinal direction and an overall width measured in a vehicle lateral direction perpendicular to the vehicle longitudinal direction, the overall length being at least twice the size of the overall width.

17. The vehicle body structure according to claim 9, wherein
the mid-section has a drain hole that extends therethrough.

18. The vehicle body structure according to claim 9, wherein
the first flange and the second flange are perpendicular to one another in the non-deformed state.

19. The vehicle body structure according to claim 9, wherein
the floor panel has a first portion, a second portion and an outer flange portion, the second portion extending from the first portion to the outer flange portion, the outer flange portion being fixed to the sill structure, and
the first flange of the reinforcing bracket is fixed to the sill structure, the second flange is fixed to the first portion of the floor panel and the mid-section extends adjacent to and spaced apart from the second portion of the floor panel in the non-deformed state.

\* \* \* \* \*